United States Patent
Van Phan et al.

(10) Patent No.: US 12,200,715 B2
(45) Date of Patent: Jan. 14, 2025

(54) INDUSTRIAL AUTOMATION SYSTEM COMMUNICATION

(71) Applicant: NOKIA TECHNOLOGIES OY, Espoo (FI)

(72) Inventors: Vinh Van Phan, Oulu (FI); Ling Yu, Kauniainen (FI); Zexian Li, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 548 days.

(21) Appl. No.: 17/309,701

(22) PCT Filed: Dec. 18, 2019

(86) PCT No.: PCT/EP2019/085909
§ 371 (c)(1),
(2) Date: Jun. 15, 2021

(87) PCT Pub. No.: WO2020/141075
PCT Pub. Date: Jul. 9, 2020

(65) Prior Publication Data
US 2022/0022172 A1   Jan. 20, 2022

Related U.S. Application Data

(60) Provisional application No. 62/787,494, filed on Jan. 2, 2019.

(51) Int. Cl.
*H04W 72/23*   (2023.01)
*H04L 41/08*   (2022.01)

(52) U.S. Cl.
CPC ......... *H04W 72/23* (2023.01); *H04L 41/0876* (2013.01)

(58) Field of Classification Search
CPC ........... G05B 19/4185; H04L 41/0876; H04W 72/20; H04W 72/23; Y02P 90/02
See application file for complete search history.

(56) References Cited

U.S. PATENT DOCUMENTS 9,955,499 B2 *   4/2018   Abinader, Jr. ........ H04W 64/00
10,084,702 B2 *   9/2018   Yan ........................ H04L 47/19
(Continued)

FOREIGN PATENT DOCUMENTS

EP   3217754 A1   9/2017

OTHER PUBLICATIONS

International Search Report and Written Opinion for International Application No. PCT/EP2019/085909, mailed Mar. 18, 2021, 10 pages.

(Continued)

*Primary Examiner* — Eric Nowlin
(74) *Attorney, Agent, or Firm* — Lippes Mathias LLP

(57) ABSTRACT

As an aspect, there is provided an apparatus configured to: obtain, by an access node from a network control entity, at least one service flow configuration for a plurality of terminal devices in an industrial automation system, the configuration indicating an association between downlink and uplink message transmissions and a cycle time requirement with regard to communication between the network control entity and the plurality of terminal devices; allocate resources as a group of shared resources for the uplink message transmission for each of the plurality of terminal devices based on the association and according to the cycle time requirement, and transmit information on the allocation to the plurality of terminal devices, the information comprising a terminal device-specific resource indicator for each of the plurality of terminal devices for avoiding collision in the uplink message transmission.

16 Claims, 4 Drawing Sheets

(56) References Cited

U.S. PATENT DOCUMENTS

Figure 1:
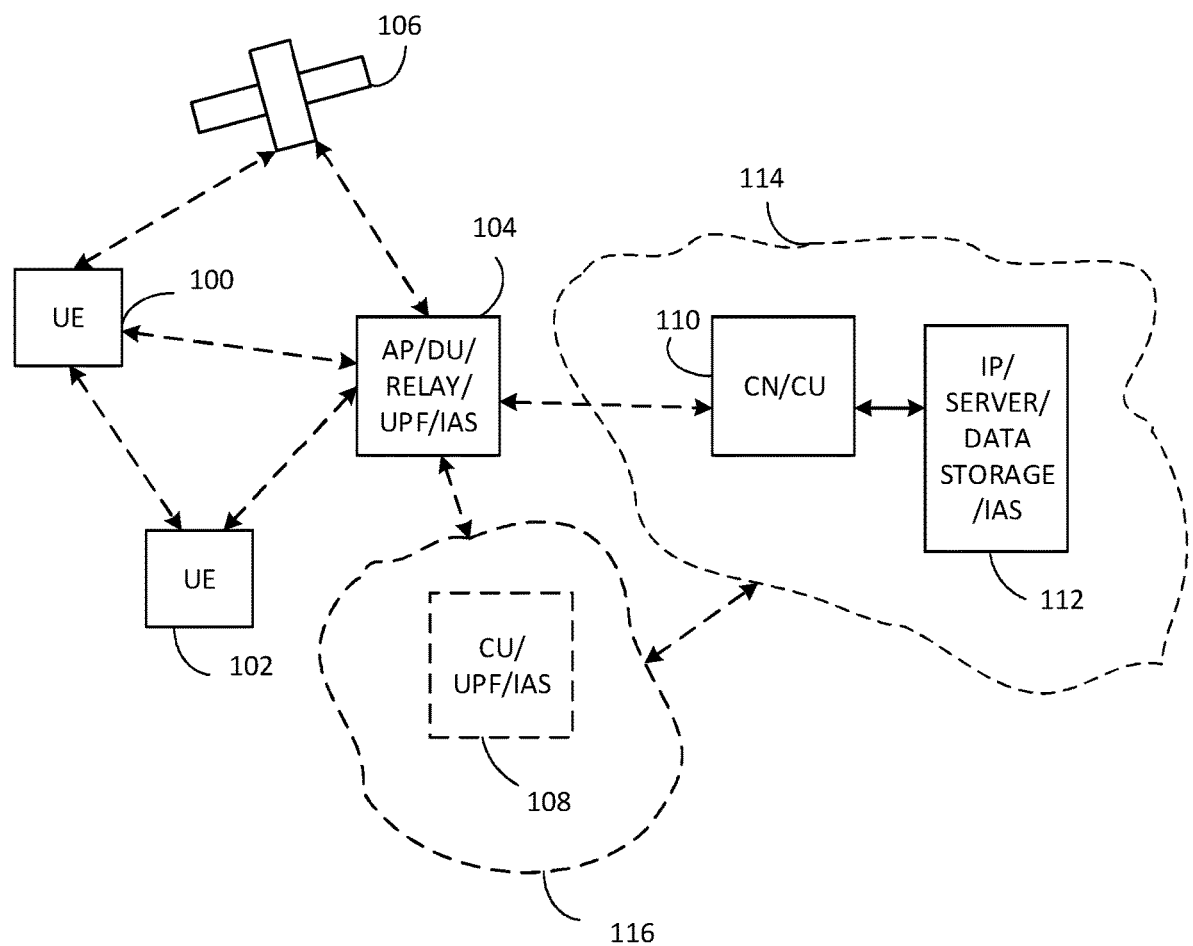

| | | | | |
|---|---|---|---|---|
| 10,264,601 | B2* | 4/2019 | Wang | H04W 72/121 |
| 10,492,102 | B2* | 11/2019 | Raleigh | H04W 28/02 |
| 10,536,933 | B2* | 1/2020 | Guo | H04W 72/21 |
| 10,555,288 | B2* | 2/2020 | Chen | H04W 52/365 |
| 10,911,354 | B2* | 2/2021 | Yan | H04L 45/64 |
| 10,966,070 | B2* | 3/2021 | Condeixa | H04W 4/46 |
| 11,812,427 | B2* | 11/2023 | Sun | H04W 76/11 |
| 2017/0078922 | A1* | 3/2017 | Raleigh | H04L 69/18 |
| 2017/0118769 | A1* | 4/2017 | Abinader, Jr. | G01S 5/0289 |
| 2017/0265167 | A1* | 9/2017 | Guo | H04W 72/30 |
| 2017/0265182 | A1* | 9/2017 | Guo | H04W 72/21 |
| 2017/0265183 | A1* | 9/2017 | Chen | H04W 52/365 |
| 2017/0359834 | A1* | 12/2017 | Wang | H04W 72/1273 |
| 2018/0220283 | A1* | 8/2018 | Condeixa | H04L 67/12 |
| 2018/0288740 | A1 | 10/2018 | Ansari | |
| 2019/0020584 | A1* | 1/2019 | Yan | H04L 45/50 |
| 2021/0112575 | A1* | 4/2021 | Sun | H04W 76/11 |
| 2023/0177949 | A1* | 6/2023 | Lee | G01R 33/07 |
| | | | | 324/207.2 |

OTHER PUBLICATIONS

3GPP TSG-SA WG1 Meeting #72, S1-154149; "CriC: Industrial Factory Automation"; Agenda Item: 8.3; Source: Qualcomm Incorporated; Anaheim, California, USA; Nov. 16-20, 2015; 4 pages.
Office Action for European Application No. 19832340.4, mailed on May 2, 2023, 7 pages.

* cited by examiner

INDUSTRIAL AUTOMATION SYSTEM COMMUNICATION

CROSS-REFERENCE TO RELATED APPLICATIONS

This application is a national stage entry of International Application No. PCT/EP2019/085909, filed Dec. 18, 2019, entitled "INDUSTRIAL AUTOMATION SYSTEM COMMUNICATION" which claims the benefit of priority of U.S. Provisional Application No. 62/787,494, filed Jan. 2, 2019, both of which are hereby incorporated by reference in their entireties.

FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Industrial automation system control, such as 3GPP new radio (NR) industrial IoT, IIoT, is one of the new use cases supported by 5G. The application of IoT to manufacturing industry is called IIoT (or Industrial Internet or Industry 4.0). It is targeted to provide predictive maintenance by using real-time data generated from IIoT systems to predict defects before they occur and thus address the issues in advance. One use case is industrial factory automation, such as motion control. In motion control applications, a system controller typically interacts with a large number of sensors and actuators (e.g., up to 100), which are integrated in a manufacturing unit. The resulting sensor/actuator density is often very high (e.g. up to 1 m$^{-3}$). Many such manufacturing units may have to be supported in close proximity to each other within a factory (e.g. up to 100 in automobile assembly line production).

BRIEF DESCRIPTION

According to an aspect, there is provided an apparatus comprising: at least one processor and at least one memory including a computer program code, the at least one memory and the computer program code configured to, with the at least one processor, cause the apparatus at least to: obtain, by an access node from a network control entity, at least one service flow configuration for a plurality of terminal devices in an industrial automation system, the configuration indicating an association between downlink and uplink message transmissions and a cycle time requirement with regard to communication between the network control entity and the plurality of terminal devices; allocate resources as a group of shared resources for the uplink message transmission for each of the plurality of terminal devices based on the association and according to the cycle time requirement, and transmit information on the allocation to the plurality of terminal devices, the information comprising a terminal device-specific resource indicator for each of the plurality of terminal devices for avoiding collision in the uplink message transmission.

According to an aspect, there is provided an apparatus comprising: at least one processor and at least one memory including a computer program code, the at least one memory and the computer program code configured to, with the at least one processor, cause the apparatus at least to: receive, by a terminal device in an industrial automation system from an access node, information on allocation of resources as a group of shared resources for uplink message transmission of a response message associated to a downlink control message, the information comprising a terminal device-specific resource indicator; in response to determining the terminal device being a target of the allocation, determine at least one resource from the group of shared resources allocated to the terminal device based on the terminal device-specific resource indicator; receive at least one control message, and transmit at least one response message to the at least one downlink control message using the determined resource.

According to an aspect, there is provided a method comprising: obtaining, by an access node from a network control entity, at least one service flow configuration for a plurality of terminal devices in an industrial automation system, the configuration indicating an association between downlink and uplink message transmissions and a cycle time requirement with regard to communication between the network control entity and the plurality of terminal devices; allocating resources as a group of shared resources for the uplink message transmission for each of the plurality of terminal devices based on the association and according to the cycle time requirement, and transmitting information on the allocation to the plurality of terminal devices, the information comprising a terminal device-specific resource indicator for each of the plurality of terminal devices for avoiding collision in the uplink message transmission.

According to an aspect, there is provided a method comprising: receiving, by a terminal device in an industrial automation system from an access node, information on allocation of resources as a group of shared resources for uplink message transmission of a response message associated to a downlink control message, the information comprising a terminal device-specific resource indicator; in response to determining the terminal device being a target of the allocation, determining at least one resource from the group of shared resources allocated to the terminal device based on the terminal device-specific resource indicator; receiving at least one control message, and transmitting at least one response message to the at least one downlink control message using the determined resource.

According to an aspect, there is provided an apparatus comprising means for obtaining, by an access node from a network control entity, at least one service flow configuration for a plurality of terminal devices in an industrial automation system, the configuration indicating an association between downlink and uplink message transmissions and a cycle time requirement with regard to communication between the network control entity and the plurality of terminal devices, means for allocating resources as a group of shared resources for the uplink message transmission for each of the plurality of terminal devices based on the association and according to the cycle time requirement, and means for transmitting information on the allocation to the plurality of terminal devices, the information comprising a terminal device-specific resource indicator for each of the plurality of terminal devices for avoiding collision in the uplink message transmission.

According to an aspect, there is provided an apparatus comprising means for receiving, by a terminal device in an industrial automation system from an access node, information on allocation of resources as a group of shared resources for uplink message transmission of a response message associated to a downlink control message, the information comprising a terminal device-specific resource indicator, means for determining, in response to determining the terminal device being a target of the allocation, at least one resource from the group of shared resources allocated to the terminal device based on the terminal device-specific resource indicator, means for determining at least one resource from the group of shared resources allocated to the terminal device based on the terminal device-specific resource indicator, means for receiving at least one control message, and means for transmitting at least one response message to the at least one downlink control message using the determined resource.

According to an aspect, there is provided a computer program product for a computer, comprising software code portions for obtaining, by an access node from a network control entity, at least one service flow configuration for a plurality of terminal devices in an industrial automation system, the configuration indicating an association between downlink and uplink message transmissions and a cycle time requirement with regard to communication between the network control entity and the plurality of terminal devices; allocating resources as a group of shared resources for the uplink message transmission for each of the plurality of terminal devices based on the association and according to the cycle time requirement, and transmitting information on the allocation to the plurality of terminal devices, the information comprising a terminal device-specific resource indicator for each of the plurality of terminal devices for avoiding collision in the uplink message transmission.

According to an aspect, there is provided a computer program product for a computer, comprising software code portions for receiving, by a terminal device in an industrial automation system from an access node, information on allocation of resources as a group of shared resources for uplink message transmission of a response message associated to a downlink control message, the information comprising a terminal device-specific resource indicator; in response to determining the terminal device being a target of the allocation, determining at least one resource from the group of shared resources allocated to the terminal device based on the terminal device-specific resource indicator; receiving at least one control message, and transmitting at least one response message to the at least one downlink control message using the determined resource.

LIST OF DRAWINGS

Figure 2:
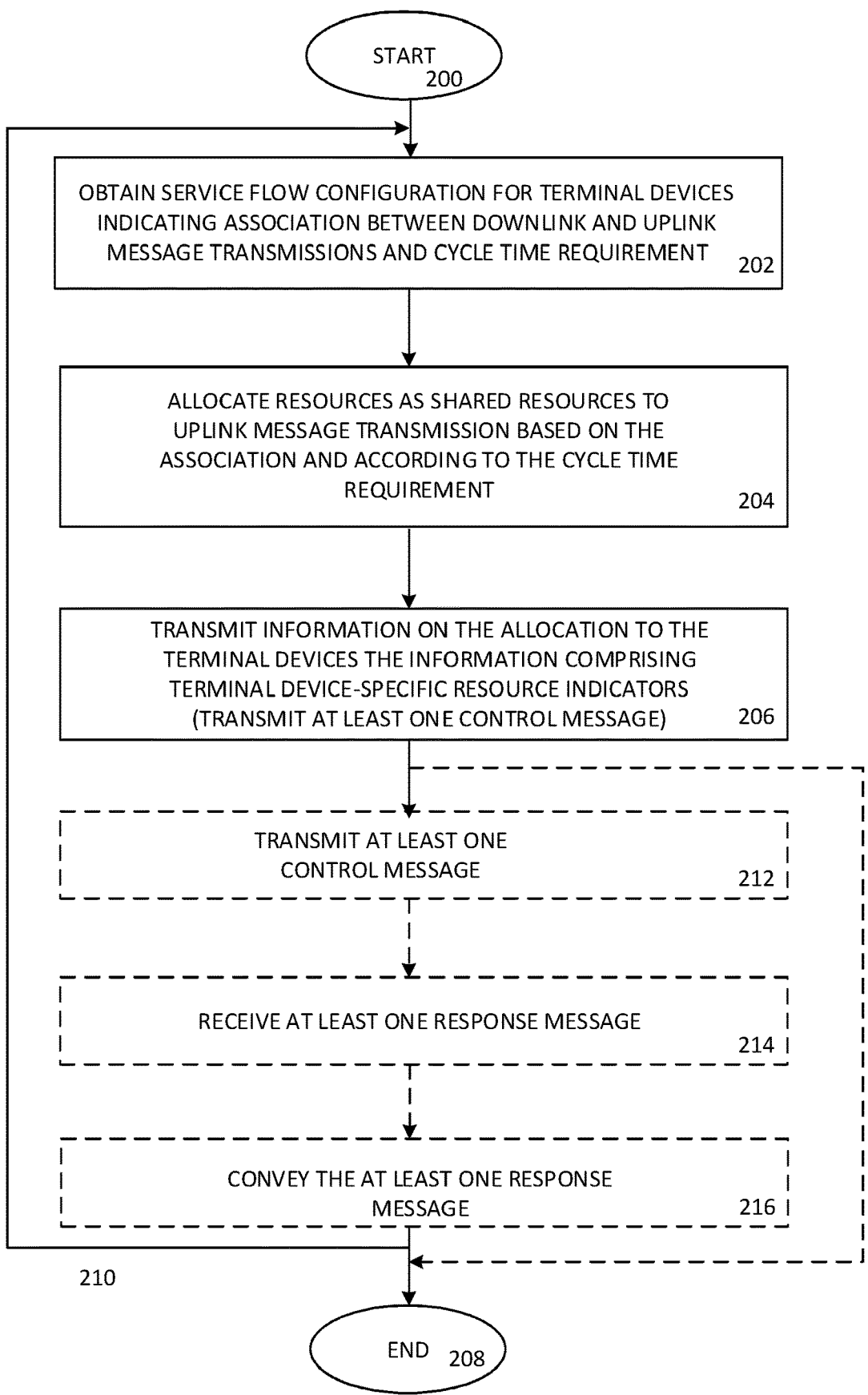
Figure 3:
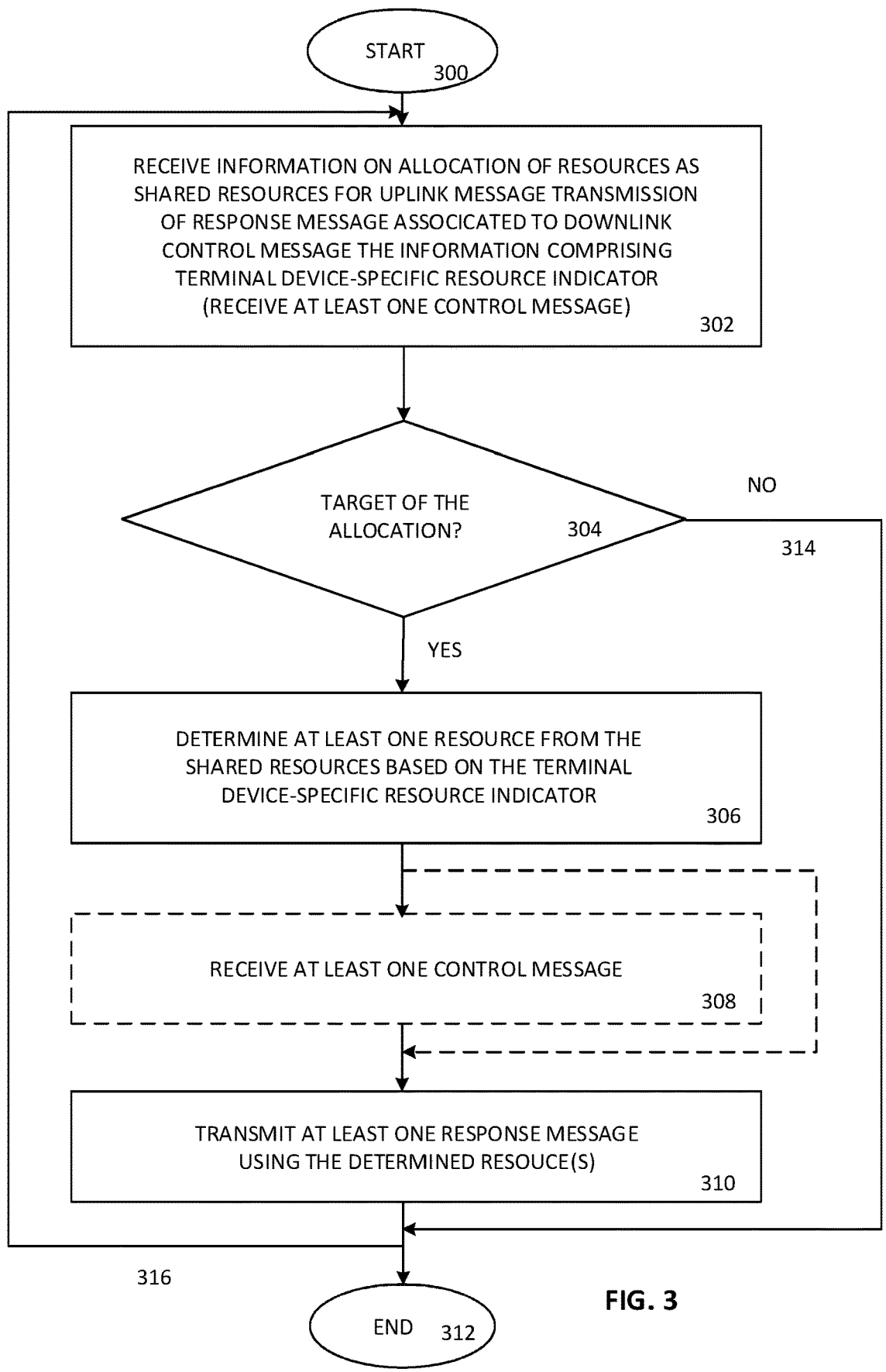
Figure 4:
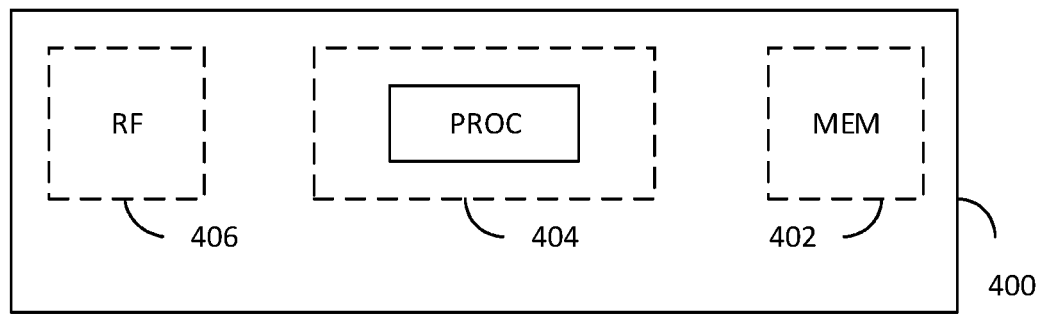
Figure 5:
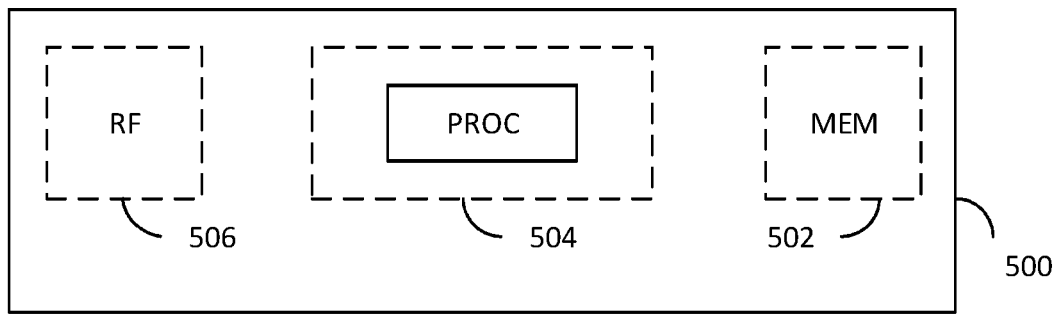

Some embodiments of the present invention are described below, by way of example only, with reference to the accompanying drawings, in which FIG. 1 illustrates an example of a system;
FIG. 2 is a flow chart;
FIG. 3 is another flow chart;
FIG. 4 illustrates an example of apparatuses, and
FIG. 5 illustrates another example of apparatuses.

DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. An example of such a relay node is a layer 3 relay (self-backhauling relay) towards a base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device, or terminal device, may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108). Utilization of cloud or edge cloud is also an option.

It should also be understood that the distribution of functionalities between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In the following, embodiments suitable for industrial automation system control, such as 3GPP new radio (NR) industrial IoT, IIoT, are described.

IIoT typically uses closed-loop control (CLC). In a closed-loop control application, the system controller periodically submits instructions to a set of sensor/actuator devices, which return a response within a cycle time. The messages, referred to as telegrams, are typically small (≤56 bytes). The cycle time can be 2 ms for example, setting stringent end-to-end latency constraints on telegram forwarding (such as 1 ms). Multi-robot cooperation is one example use case in closed-loop control where a group of robots collaborate to conduct an action, for example, symmetrical welding of a car body to minimize deformation. This requires isochronous operation between all robots. For multi-robot cooperation, the jitter (such as 1 µs) is among the command messages of a control event to the group robots.

A typical industrial closed-loop motion control application is based on individual control events. Each closed-loop control event consists of a downlink transaction followed by a synchronous uplink transaction, both of which are executed within a cycle time. Control events within a manufacturing unit may have to occur isochronously. Factory automation considers application-layer transaction cycles between a system controller and sensor/actuator devices. Each transaction cycle consists of (1) a command sent by the controller to the sensor/actuator (via an access node of a radio communications system, such as a gNB), (2) application-layer processing on the sensor/actuator device, and (3) a subsequent response by the sensor/actuator to the controller (via an access node of a radio communications system, such as a gNB). Cycle time includes the entire transaction from the transmission of a command by the controller to the reception of a response by the controller. It includes all lower layer processes and latencies on the air interface as well the application-layer processing time on the sensor/actuator.

Ultra-reliable and low latency communication (URLLC) is one of the enabling technologies in the fourth industrial revolution. One typical industrial automation use case requiring URLLC is enabling time-critical factory automation, for example in relation to industrial closed-loop motion control.

One embodiment starts in block 200 of FIG. 2. This embodiment is suitable for being carried out by an access node, such as gNB and/or user plane function (UPF) as a service router. The gNB may be implemented as a CU or DU or a combination thereof. The UPF may be located in the CU or DU (in FIG. 1, 104, 108) depending on latency requirements or selected design options, for example. In an industrial automation system, the access node and/or UPF may be co-located with the industrial automation system controller or locate in the proximity and coupled to the controller with a high-speed interface. As to the system described in FIG. 1, it should be understood that in an industrial automation system, there typically are more terminal devices than those shown in FIG. 1 and for meeting the latency requirements, cloud may be used, but usually edge cloud (116). The motivation is to provide server resources, data analysis and artificial intelligence closer to data collection sources, such as sensors as well as closer to actuators. Thus, gNB and/or UPF (DU 104 or edge cloud 116 CU 108) as well as the controller of the IAS system (104) usually locate in a factory or other premises the IAS system is utilized or in the edge cloud (116) as the CU (108).

Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

Control and User Plane Separation (CUPS) is a key feature being carried forward in 5G. CUPS defines the separation of the Session Management Function (SMF) and User Plane Function (UPF) in the next generation mobile core. URLLC may require the UPF to be deployed at the network edge, collocated with an access node (gNB), close to the end user to achieve the latency requirements associated with the service.

The isochronous operation of industrial automation system (IAS) requires a number of user devices or terminal devices of IAS to be polled, receiving a request and transmitting a response, in the same closed-loop control cycle. The cycle time can be as low as 2 ms, or even lower. In the isochronous operation, a single execution of a control loop function ends before the next transfer period starts. Thus, all frames must be received by the addressed application within the transfer time.

Thus, in order to support the challenging isochronous operation of URLLC as described above, the serving radio network must be able to schedule for a number of terminal devices to receive a request and transmit a response in a fraction of 1 ms for each of the receiving and transmitting directions per a closed-loop control cycle of 2 ms, for example.

In block 202, at least one service flow configuration for a plurality of terminal devices in an industrial automation system is obtained from a network control entity, the configuration indicating an association between downlink and uplink message transmissions and a cycle time requirement with regard to communications between the network control entity and the plurality of terminal devices.

In an embodiment, downlink and uplink message transmissions take place using a radio interface.

The network control entity may be access and mobility management function (AMF) and/or session management function (SMF) and/or an industrial automation system controller (the controller of the IAS service) usually communicating via application function (AF), policy control function (PCF), AMF and/or SMF. The AMF supports the termination of NAS signaling, NAS ciphering & integrity protection, registration management, connection management, mobility management, access authentication and authorization, security context management. The SMF supports: session management (session establishment, modification, releasing), UE IP address allocation & management, dynamic host configuration protocol (DHCP) functions, termination of NAS signaling related to session management, DL data notification, traffic steering configuration for UPF for proper traffic routing. The AMF and SMF are typically located in a cloud (In FIG. 1 110).

For effective usage of resources, only those terminal devices that are requested by the network control entity in the same closed-loop control cycle are supposed to respond and thus be configured to transmit the response by the access node. This implies that only those user devices or terminal devices that are scheduled to receive a downlink (control) message comprising explicitly or implicitly a request to transmit an uplink (response) message in the closed-loop control cycle. Thus, the scheduled downlink (radio) message can be considered as a grant for the scheduled uplink (radio) message for each of the scheduled terminal devices, simultaneously or at least within a predefined time window, for example 0.5 ms. Therefore, the at least one service flow configuration may further comprise terminal device-specific identifier, which may be in a list format when more than one terminal devices are requested or the access node may collect the list based on the flows. One typical case, where not all the terminal devices are receiving a control message is, when the network control entity has detected a failure in the operation of a robot or there is some other issue in the production line, which does not have an influence on all the robots, for example, in a symmetrical welding of a car body, where quality control has found a quality issue and some of the robots are commanded to correct the welding and/or stop the erroneous operation and be reprogrammed.

It is also possible that the downlink (control) messages are to be delivered in a certain order for the actions of robots being made in right order, that is to say the at least one service flow configuration is for sequential actions. Hence, the at least one service flow configuration may further comprise an order of terminal devices to be used in the allocation thus enabling control commands being delivered in the right order.

Another option is that some commands are more urgent than others and thus priorities for the at least one service flow configuration or for a part of the at least one service flow configuration may be indicated.

The access node stores or has an access to the context information of terminal devices, such as identity information of the scheduled terminal devices and timing information of the current control cycle in order being able to carry out resource configuration.

A service flow configuration may be Quality of Service (QoS), flows and can be referred to as URLLC-CLC QoS flows. The contexts of these URLLC-CLC QoS flows may comprise: (i) implication that each downlink (DL) message (a request originating from a service controller of the industrial automation system (IAS)) sent on an URLLC-CLC QoS flow is associated with an uplink (UL) message (a response from the requested end-user) to be received within a predefined time limit, as of the closed-loop control of URLLC, (ii) timing information related to the isochronous operation of the IAS valid across all the configured URLLC-CLC QoS flows for selected terminal devices of the IAS. In one option, the timing information may be given as a relative timing offset corresponding to arrival timing of DL messages across the configured URLLC-CLC QoS flows of the IAS at UPF or gNB.

As presented above, IIoT typically uses closed-loop control (CLC). In a closed-loop control application, the controller periodically submits instructions to a set of sensor/actuator devices, which return a response within a cycle time. The messages, referred to as telegrams, are typically small (≤56 bytes). The cycle time can be 2 ms, for example, setting stringent end-to-end latency constraints on telegram forwarding (such as 1 ms).

In block 204, resources are allocated as a group of shared resources for the uplink message transmission for each of the plurality of terminal devices based on the association and according to the cycle time requirement.

The resources may be allocated for grant-free communications.

The capacity of the serving cell provided by the access node for supporting the isochronous operation of URLLC is rather limited, also in terms of adaptation possibilities for dynamic scheduling. Thus, the access node is not able to allocate an exclusive grant-free UL semi persistent scheduling (SPS) instance for each terminal device for the isochronous operation of the IAS. However, by knowing in advance the transmission demand for the isochronous operation of the IAS, the access node is able to allocate a set of UL resource allocation/scheduling profiles (denoted as RAP/SP) to serve the isochronous transmission demand of the IAS. An RAP/SP may be similar to the grant-free SPS (i.e., including time-frequency domain resources, also referred to as physical resource blocks, and other UL transmission related information such as modulation and coding scheme), but does not have an SPS interval defined. Instead, each RAP/PS instance may be assigned by the access node and used by one scheduled terminal device at a time to transmit a (response) message in UL. The assignment of the RAP/AP by the access node to each terminal device in the same close-loop control cycle for isochronous operation do not include overlapping UL resources in order to avoid the collision of UL transmissions.

The group or pool of RAP/SP instances may comprise or be linked to resource allocation/scheduling profiles with different amount of frequency resource blocks as well as different modulation and coding schemes in order to adapt and select the right RAP/SP instance based on the link quality, for example.

An individual terminal device of the IAS, which is determined as a target of messaging by the service controller of the IAS in the given closed-loop control cycle, is scheduled, by the access node, to receive a DL message comprising a request from the controller and, along with receiving the DL message, an information on how to find the allocated UL RAP/SP instance out of the configured resource group or shared pool. The information may be an index of the corresponding RAP/SP instance. Terminal device-specific resource indicators may be sent on either L1 physical downlink control channel (PDCCH), or as a L2 medium access control (MAC) control element (CE) in the same transport block carrying the DL message, or as a control header of packet data convergence protocol (PDCP) or MAC-d PDU (protocol data unit) carrying the DL message, or as a MAC-c PDU concatenated with the PDCP D-PDU carrying the DL message. The terminal device determines the allocated RAP/SP instance(s) out of the allocated group or pool of shared resources to be used for transmitting a response in UL based on the received indicator(s). The access node may configure a mapping rule upon admission control or setup of corresponding radio bearer for a configured URLLC-CLC QoS flow. The mapping rule may also be indicated along with the DL message. The mapping rule may be a table of indexed RAP/SP instances and/or orders of terminal device identifiers and/or functions of resources allocated by the access node for transmitting corresponding DL messages, as configured to individual terminal device of the IAS. The access node may also allocate more than one RAP/SP instance per a terminal device, for instance, for responding to several downlink (control) messages and each of the instances may have an indicator of its own.

In order to facilitate the access node to determine and allocate the resource pool or set of UL RAP/SP instances as well as the mapping rule for the isochronous operation of URLLC required by the IAS system being served, the access node needs to know and agree on identity of the IAS and traffic demand for the isochronous operation of the IAS, such as the maximum number of terminal devices that may be scheduled in the same closed-loop control cycle, maximum size of messages, maximum/minimum transfer interval of terminal devices in question and DL messages, etc. Context information of the IAS system being served may be communicated and agreed in advance as a service setup operation.

In block 206, information on the allocation to the plurality of terminal devices is transmitted, the information comprising a terminal device-specific resource indicator for each of the plurality of terminal devices for avoiding collision in the uplink message transmission.

In one embodiment, the terminal device-specific resource indicator may be an index a terminal device may use in defining resources allocated to it for transmitting uplink response message according the mapping rule, for example a table. The mapping rule may be transmitted with the information on allocation or in advance with regard to a service setup. The transmission of the information on the allocation may be carried out either as an L3 radio resource control (RRC) signaling as an L1 allocation message sent an PDCCH, or as an L2 part of the control message sent on the MAC layer, etc.

It is noted that the DL message of the scheduled terminal devices may be transmitted either as unicast to each of the scheduled terminal device or a groupcast to all the scheduled terminal devices. (Response) UL messages may be transmitted by using unicast radio bearer(s). The access node may provide a list of all terminal devices requested in the current cycle based on the terminal device-specific identifiers (block 202) to which resources in the current cycle has been allocated not to waste the resources of other terminal devices for them having to listen and decode an unintended message, especially in the case of groupcast. In order to reduce signaling overhead, the access node may assign a terminal device index or identifier to each terminal device of the IAS upon admission control, allowing the terminal devices to access the serving cell for the IAS operation. In this case the service flows and the indexes or identifiers assigned in the admission control may be mapped together by using a table. Thus, the terminal device-specific identifiers may be assigned by the network control entity, such as AMF and/or SMF or service controller of the IAS, or by the access node.

As a part of control operation with regard to the IAS service at issue, the access node may transmit, as a downlink (control) message transmission (under a control of a controller of the IAS service), at least one control message (received from the controller of the IAS service) to at least one of the plurality of terminal devices according to the cycle time requirement (212), receive at least one response message, as an uplink message transmission, from the at least one of the plurality of terminal devices according to the allocation (214), and convey the at least one response message from the at least one of the plurality of terminal devices to the controller of the IAS service according to the cycle time requirement 216). The at least one control message may be transmitted along with the transmitting of the information on the allocation as well.

The embodiment ends in block 208. The embodiment(s) is repeatable in many ways. One example is shown by arrow 210 in FIG. 2. It should be understood, that the embodiment(s) may be repeated one or more times with a constant or variable pause between separate rounds.

Another embodiment starts in block 300 of FIG. 3. This embodiment is suitable for being carried out by a terminal device in an industrial automation system. As to the system described in FIG. 1, it should be understood, that in an industrial automation system, there typically are more terminal devices than those shown in FIG. 1 and for meeting the latency requirements, cloud may be used, but usually edge cloud. The motivation is to provide server resources, data analysis and artificial intelligence closer to data collection sources, such as sensors as well as closer to actuators. Thus, gNB as well as the controller of the IAS system usually locate in a factory or other premises the IAS system is utilized.

The isochronous operation of industrial automation system (IAS) requires a (high) number of user devices or terminal devices of IAS to be polled, receiving a request and transmitting a response, in the same closed-loop control cycle. The cycle time can be 2 ms for example. In the isochronous operation, a single execution of a control loop function ends before the next transfer period starts. Thus, all frames must be received by the addressed application within the transfer time.

Terms "receive" and "transmit" may comprise reception or transmission via a radio path. These terms may also mean preparation of a message to the radio path for an actual transmission or processing a message received from the radio path, for example, or controlling or causing a transmission In block 302, information on allocation of resources as a group of shared resources for uplink message transmission of a response message associated with downlink message transmission of a control message is received by a terminal device in the industrial automation system from an access node. The information comprises a terminal device-specific resource indicator and may further comprise at least one terminal device-specific identifier to be used, for example, in the case the information is groupcast, not unicast to each terminal device separately.

In one embodiment, the terminal device-specific resource indicator may be an index a terminal device may use in defining resources allocated to it for transmitting an uplink response message according the mapping rule, for example a table. The mapping rule may be transmitted with the information on allocation or in advance with regard to a service setup.

Resources for uplink response message are allocated as a group of UL resource allocation/scheduling profiles (denoted as RAP/SP) to serve the isochronous transmission demand of the IAS. An RAP/SP may be similar to the grant-free SPS (i.e., including time-frequency domain resources, also referred to as physical resource blocks, and other UL scheduling grant related information such as modulation and coding scheme), but does not have an SPS interval defined. Instead, each RAP/PS instance may be assigned by the access node and used by one scheduled terminal device at a time to transmit a (response) message in UL. The assignment of the RAP/AP by the access node to each terminal device in the same close-loop control cycle for isochronous operation do not to include overlapping UL resources in order to avoid the collision of UL transmissions.

The group or pool of RAP/SP instances may comprise or be linked to resource allocation/scheduling profiles with different amount of frequency resource blocks as well as different modulation and coding schemes in order to adapt and select the right RAP/SP instance based on the link quality, for example.

An individual terminal device of the IAS, which is determined as a target of messaging by the service controller of the IAS in the given closed-loop control cycle, is scheduled, by the access node, to receive a DL message comprising a request from the controller and, along with receiving the DL message, an information on how to find the allocated UL RAP/SP instance out of the configured resource group or shared pool. The information may be an index of the corresponding RAP/SP instance. Terminal device-specific resource indicators may be sent on either L1 physical downlink control channel (PDCCH), or as a L2 medium access control (MAC) control element (CE) in the same transport block carrying the DL message, or as a control header of packet data convergence protocol (PDCP) or MAC-d PDU (protocol data unit) carrying the DL message, or as a MAC-c PDU concatenated with the PDCP D-PDU carrying the DL message. The terminal device determines the allocated RAP/SP instance(s) out of the allocated group or pool of shared resources to be used for transmitting a response in UL based on the received indicator(s). The access node may configure a mapping rule upon admission control or setup of corresponding radio bearer for a configured URLLC-CLC QoS flow. The mapping rule may also be indicated along with the DL message. The mapping rule may be a table of indexed RAP/SP instances and/or orders of terminal device identifiers and/or functions of resources allocated by the access node for transmitting corresponding DL messages, as configured to individual terminal device of the IAS. The access node may also allocate more than one RAP/SP instance per a terminal device, for instance, for responding to several downlink (control) messages and each of the instances may have an indicator of its own.

For effective usage of resources, only those terminal devices that are requested to respond in the same closed-loop control cycle are supposed to respond and thus be configured by the access node. This implies that only those user devices or terminal devices that are scheduled to receive a downlink (control) message comprising explicitly or implicitly a request to transmit an uplink (response) message in the closed-loop control cycle. Thus, the scheduled downlink message can be considered as a grant for the scheduled uplink message for each of the scheduled terminal devices, simultaneously or at least within a predefined time window, as low as 0.5 ms. Therefore, the information on the allocation of resources may also comprise at least one terminal device-specific identifier, which may be in a list format when more than one terminal devices are requested. The at least one terminal device-specific identifier may be used, for example, in the case the information is groupcast, not unicast to each terminal device separately.

In block 304, 306 in response to determining, the terminal device being a target of the allocation, determining at least one resource from the group of shared resources allocated to the terminal device.

The terminal device being a target of the allocation may be determined based on received unicast transmission of the information on the allocation of resources targeted to the terminal device or based on terminal device-specific identifier in the groupcast information on the allocation.

The terminal device may determine which one(s) of the configured RAP/SP instances, out of the allocated group, is allocated to it for transmitting a response in UL, based on the received terminal device-specific resource indicator based on the indicated index of the corresponding RAP/SP instance and a mapping rule. The access node may configure a mapping rule upon admission control or the setup of corresponding radio bearer. The mapping rule may be a table of indexed resources. The access node may have allocated more than one uplink resources, for example for responding to several downlink (control) messages and each of the instances may have an indicator of its own.

In the case the terminal device is not a target of the allocation it is not a target for downlink control messaging, at least in this control cycle, and it does nothing which is depicted by arrow 314.

In block 308, at least one control message is received.

It should be appreciated that the information on the allocation of resources and the control message may be separate messages or combined messages, in the case the messages are transmitted as combined, block 306 is combined with block 302. This is depicted by dashed lines.

The control message is with regard to an isochronous operation of industrial automation system (IAS) generated by the controller of the IAS service and transmitted by a serving access node.

In block, 310, at least one response message to the at least one control message is transmitted using the determined resource.

The embodiment ends in block 312. The embodiment(s) is repeatable in many ways. One example is shown by arrow 316 in FIG. 3. It should be understood, that the embodiment (s) may be repeated one or more times with a constant or variable pause between separate rounds.

FIG. 4 illustrates a simplified block diagram of an apparatus according to an embodiment in relation to FIG. 2.

An embodiment provides an apparatus which may be an access node and/or UPF or any other suitable apparatus capable to carry out processes described above in relation to FIG. 2. The apparatus is suitable for operating as a serving access node some implementation options of which, for example as to CU/DU division as well as the location of the UPF, are explained with regard to FIGS. 1 and 2.

It should be appreciated that the apparatus may include or otherwise be in communication with a control unit, one or more processors or other entities capable of carrying out operations according to the embodiments described by means of FIG. 2. It should be understood, that each block of the flowchart of FIG. 2 and any combination thereof may be implemented by various means or their combinations, such as hardware, software, firmware, one or more processors and/or (electronic) circuitry.

Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

As an example of an apparatus according to an embodiment, it is shown apparatus 400, such as an access node and/or UPF, including facilities in control unit or circuit/circuitry 404 (including one or more processors, for example) to carry out functions of embodiments according to FIG. 2. The facilities may be software, hardware or combinations thereof as described in further detail below.

In FIG. 4, block 406 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. The apparatus may also include or be coupled to one or more internal or external memory units.

Another example of apparatus 400 may include at least one processor 404 and at least one memory 402 including a computer program code, the at least one memory and the computer program code configured to, with the at least one processor, cause the apparatus at least to: obtain, by an access node from a network control entity, at least one service flow configuration for a plurality of terminal devices in an industrial automation system, the configuration indicating an association between downlink and uplink message transmissions and a cycle time requirement with regard to communication between the network control entity and the plurality of terminal devices; allocate resources as a group of shared resources for the uplink message transmission for each of the plurality of terminal devices based on the association and according to the cycle time requirement, and transmit information on the allocation to the plurality of terminal devices, the information comprising a terminal device-specific resource indicator for each of the plurality of terminal devices for avoiding collision in the uplink message transmission.

It should be understood, that the apparatus may include or be coupled to other units or modules etc., such as radio parts or radio heads, used in or for transmission and/or reception. This is depicted in FIG. 4 as optional block 406.

Yet another example of an apparatus comprises means (404, 406) for obtaining, by an access node from a network control entity, at least one service flow configuration for a plurality of terminal devices in an industrial automation system, the configuration indicating an association between downlink and uplink message transmissions and a cycle time requirement with regard to communication between the network control entity and the plurality of terminal devices, means (402, 404) for allocating resources as a group of shared resources for the uplink message transmission for each of the plurality of terminal devices based on the association and according to the cycle time requirement, and means (404, 406) for transmitting information on the allocation to the plurality of terminal devices, the information comprising a terminal device-specific resource indicator for each of the plurality of terminal devices for avoiding collision in the uplink message transmission.

It should be understood, that the apparatus may include or be coupled to other units or modules etc., such as radio parts or radio heads, used in or for transmission and/or reception. This is depicted in FIG. 4 as optional block 406. The apparatus may also include or be coupled to a communications or user interface.

Although the apparatuses have been depicted as one entity in FIG. 4, different modules and memory may be implemented in one or more physical or logical entities.

FIG. 5 illustrates a simplified block diagram of an apparatus according to an embodiment in relation to FIG. 3. The embodiment provides an apparatus which may be a terminal device or any other suitable apparatus capable to carry out processes described above in relation to FIG. 3.

It should be appreciated that the apparatus may include or otherwise be in communication with a control unit, one or more processors or other entities capable of carrying out operations according to the embodiments described by means of FIG. 3. It should be understood, that each block of the flowchart of FIG. 3 and any combination thereof may be implemented by various means or their combinations, such as hardware, software, firmware, one or more processors and/or circuitry. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

As an example of an apparatus according to an embodiment, it is shown apparatus 500, such as an access node, including facilities in control unit or circuit/circuitry 504 (including one or more processors, for example) to carry out functions of embodiments according to FIG. 3. The facilities may be software, hardware or combinations thereof as described in further detail below.

In FIG. 5, block 506 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. The apparatus may also include or be coupled to one or more internal or external memory units.

Another example of apparatus 500 may include at least one processor 604 and at least one memory 502 including a computer program code, the at least one memory and the computer program code configured to, with the at least one processor, cause the apparatus at least to: receive, by a terminal device in an industrial automation system from an access node, information on allocation of resources as a group of shared resources for uplink message transmission of a response message associated to a downlink control message, the information comprising a terminal device-specific resource indicator; in response to determining, the terminal device being a target of the allocation, determine at least one resource from the group of shared resources allocated to the terminal device based on the terminal device-specific resource indicator; receive at least one control message, and transmit at least one response message to the at least one downlink control message using the determined resource.

It should be understood that the apparatus may include or be coupled to other units or modules etc., such as radio parts or radio heads, used in or for transmission and/or reception. This is depicted in FIG. 5 as optional block 506.

Yet another example of an apparatus comprises means (504, 506) for receiving, by a terminal device in an industrial automation system from an access node, information on allocation of resources as a group of shared resources for uplink message transmission of a response message associated to a downlink control message, the information comprising a terminal device-specific resource indicator, means (502, 504) for determining, in response to determining the terminal device being a target of the allocation, at least one resource from the group of shared resources allocated to the terminal device based on the terminal device-specific resource indicator, means (502, 504) for determining at least one resource from the group of shared resources allocated to the terminal device based on the terminal device-specific resource indicator, means (504, 506) for receiving at least one control message, and means (504, 506) for transmitting at least one response message to the at least one downlink control message using the determined resource.

It should be understood, that the apparatus may include or be coupled to other units or modules etc., such as radio parts or radio heads, used in or for transmission and/or reception. This is depicted in FIG. 5 as optional block 506.

Although the apparatuses have been depicted as one entity in FIG. 5, different modules and memory may be implemented in one or more physical or logical entities.

An apparatus may in general include at least one processor, controller, unit, module or (electronic) circuitry designed for carrying out functions of embodiments operationally coupled to at least one memory unit (or service) and to typically various interfaces. A circuitry may refer to hardware-only circuit implementations, such as implementations in only analog and/or digital circuitry, combinations of circuits and software (and/or firmware), such as different kind of processors of portions of them, software and/or circuit components, such as a microprocessor(s) or a portion of a microprocessor(s). Further, the memory units may include volatile and/or non-volatile memory. The memory unit may store computer program code and/or operating systems, information, data, content or the like for the processor to perform operations according to embodiments described above in relation to FIG. 2 or 3. Each of the memory units may be a random-access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be an (electronic) circuit or a system of (electronic) circuits performing a particular function in an electronic device with a computer program code. The (electronic) circuit may comprise at least one processor and additionally at least one internal or external memory.

As used in this application, the term 'circuitry' (or circuit) refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/ software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. The data storage medium may be a non-transitory medium. The computer program or computer program product may also be downloaded to the apparatus. A computer program product may comprise one or more computer-executable components which, when the program is run, for example by one or more processors possibly also utilizing an internal or external memory, are configured to carry out any of the embodiments or combinations thereof described above by means of FIG. 2 or 3 4. The one or more computer-executable components may be at least one software code or portions thereof. Computer programs may be coded by a programming language or a low-level programming language.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Embodiments provide computer programs comprising instructions which, when the program is executed by an apparatus, cause the apparatus to carry out embodiments described by means of FIG. 2 or 3.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

As an aspect, there is provided an apparatus comprising means for carrying out the method according to any one of claims 10 to 15 or 16 to 18.

As an aspect, there is provided a computer program product for a computer, comprising software code portions for performing the steps of any of claims 10 to 15 or 16 to 18, when said product is run on the computer.

The invention claimed is:

1. An apparatus comprising:
    at least one processor and at least one memory including a computer program code, the at least one memory and the computer program code configured to, with the at least one processor, cause the apparatus at least to:
    obtain, by an access node from a network control entity, at least one service flow configuration for a plurality of terminal devices in an industrial automation system, the at least one service flow configuration indicating an association between a downlink message transmission and an uplink message transmission and a cycle time requirement with regard to communication between the network control entity and the plurality of terminal devices;
    allocate resources as a group of shared resources for the uplink message transmission for each of the plurality of terminal devices based on the association and according to the cycle time requirement, and
    transmit information on the allocation to the plurality of terminal devices, the information comprising a terminal device-specific resource indicator for each of the plurality of terminal devices for avoiding collision in the uplink message transmission,
    wherein in response to the at least one service flow configuration being for sequential actions, the at least one service flow configuration further comprises an order of terminal devices to be used in the allocation.

2. The apparatus of claim 1, further comprising causing the apparatus to:
    transmit, as the downlink message transmission, at least one control message, received from the network control entity, to at least one of the plurality of terminal devices according to the cycle time requirement;
    receive at least one response message, as the uplink message transmission, from the at least one of the plurality of terminal devices according to the allocation, and
    convey the at least one response message from the at least one of the plurality of terminal devices to the network control entity according to the cycle time requirement.

3. The apparatus of claim 1, further comprising causing the apparatus to:
    indicate priorities for the at least one service flow configuration or for a part of the at least one service flow configuration.

4. The apparatus of claim 1, the at least one service flow configuration further comprising a terminal device-specific indication.

5. The apparatus of claim 1, wherein the at least one service flow configuration is for an isochronous closed-loop control operation of the industrial automation system.

6. An apparatus comprising:
    at least one processor and at least one memory including a computer program code, the at least one memory and the computer program code configured to, with the at least one processor, cause the apparatus at least to:
    receive, by a terminal device in an industrial automation system from an access node, information on allocation of resources as a group of shared resources for uplink message transmission of a response message associated to a downlink control message, the information comprising a terminal device-specific resource indicator, wherein the information on allocation of resources is based on at least one service flow configuration for a plurality of terminal devices in the industrial automation system, the at least one service flow configuration indicating an association between a downlink message transmission and an uplink message transmission and a cycle time requirement with regard to communication between the network control entity and the plurality of terminal devices and wherein the at least one service flow configuration comprises an order of terminal devices to be used in the allocation;
    in response to determining the terminal device being a target of the allocation,
    determine at least one resource from the group of shared resources allocated to the terminal device based on the terminal device-specific resource indicator;
    receive at least one other control message, and
    transmit at least one response message to the at least one downlink control message using the determined resource.

7. The apparatus of claim 6, wherein the information further comprises at least one terminal device-specific identifier and the terminal device-specific resource indicator comprises an index the terminal device may use in defining resources allocated to it for transmitting an uplink response message according a mapping rule, wherein the mapping rule is received with the information on allocation or in advance with regard to a service setup.

8. The apparatus of claim 6, wherein the at least one other control message is with regard to an isochronous closed-loop control operation of the industrial automation system.

9. A method comprising:
- obtaining, by an access node from a network control entity, at least one service flow configuration for a plurality of terminal devices in an industrial automation system, the at least one service flow configuration indicating an association between a downlink message transmission and an uplink message transmission and a cycle time requirement with regard to communication between the network control entity and the plurality of terminal devices;
- allocating resources as a group of shared resources for the uplink message transmission for each of the plurality of terminal devices based on the association and according to the cycle time requirement, and
- transmitting information on the allocation to the plurality of terminal devices, the information comprising a terminal device-specific resource indicator for each of the plurality of terminal devices for avoiding collision in the uplink message transmission,
- wherein in response to the at least one service flow configuration being for sequential actions, the at least one service flow configuration further comprises an order of terminal devices to be used in the allocation.

10. The method of claim 9, further comprising:
- transmitting, as the downlink message transmission, at least one control message, received from the network control entity, to at least one of the plurality of terminal devices according to the cycle time requirement;
- receiving at least one response message, as the uplink message transmission, from the at least one of the plurality of terminal devices according to the allocation, and
- conveying the at least one response message from the at least one of the plurality of terminal devices to the network control entity according to the cycle time requirement.

11. The method of claim 9, further comprising:
- indicating priorities for the at least one service flow configuration or for a part of the at least one service flow configuration.

12. The method of claim 9, the at least one service flow configuration further comprising a terminal device-specific indication.

13. The method of claim 9, wherein the at least one service flow configuration is for an isochronous closed-loop control operation of the industrial automation system.

14. A method comprising:
- receiving, by a terminal device in an industrial automation system from an access node, information on allocation of resources as a group of shared resources for uplink message transmission of a response message associated to a downlink control message, the information comprising a terminal device-specific resource indicator, wherein the allocation of resources is based on at least one service flow configuration for a plurality of terminal devices in the industrial automation system, the at least one service flow configuration indicating an association between a downlink message transmission and an uplink message transmission and a cycle time requirement with regard to communication between the network control entity and the plurality of terminal devices and wherein the at least one service flow configuration comprises an order of terminal devices to be used in the allocation;
- in response to determining the terminal device being a target of the allocation,
- determining at least one resource from the group of shared resources allocated to the terminal device based on the terminal device-specific resource indicator;
- receiving at least one other control message, and
- transmitting at least one response message to the at least one downlink control message using the determined resource.

15. The method of claim 14, wherein the information further comprises at least one terminal device-specific identifier and the terminal device-specific resource indicator comprises an index the terminal device may use in defining resources allocated to it for transmitting an uplink response message according a mapping rule, wherein the mapping rule is received with the information on allocation or in advance with regard to a service setup.

16. The method of claim 14, wherein the at least one other control message is with regard to an isochronous closed-loop control operation of the industrial automation system.

* * * * *